(12) United States Patent
Lee et al.

(10) Patent No.: US 7,819,626 B2
(45) Date of Patent: Oct. 26, 2010

(54) PLASMA BLADE TIP CLEARANCE CONTROL

(75) Inventors: Ching-Pang Lee, Cincinnati, OH (US); Aspi Rustom Wadia, Loveland, OH (US); David Glenn Cherry, Loveland, OH (US); Scott Michael Carson, Mason, OH (US)

(73) Assignee: General Electric Company, Schenectady, NY (US)

( * ) Notice: Subject to any disclaimer, the term of this patent is extended or adjusted under 35 U.S.C. 154(b) by 1013 days.

(21) Appl. No.: 11/580,789

(22) Filed: Oct. 13, 2006

(65) Prior Publication Data

US 2008/0089775 A1    Apr. 17, 2008

(51) Int. Cl.
*F01D 11/20* (2006.01)
*F01D 11/24* (2006.01)

(52) U.S. Cl. ............... 415/173.2; 415/176; 415/178; 415/914

(58) Field of Classification Search ........... 415/1, 415/173.1–173.5, 175–178, 914
See application file for complete search history.

(56) References Cited

U.S. PATENT DOCUMENTS

| | | | | |
|---|---|---|---|---|
| 5,100,291 | A * | 3/1992 | Glover | 415/115 |
| 7,503,179 | B2 * | 3/2009 | Estridge et al. | 415/115 |
| 7,597,537 | B2 * | 10/2009 | Bucaro et al. | 415/173.2 |
| 2006/0005545 | A1 | 1/2006 | Samimy et al. | |

FOREIGN PATENT DOCUMENTS

EP    1906136 A1    9/2008
WO    WO2005/114013 A1    12/2005

OTHER PUBLICATIONS

European Search Report and Opinion, Application No. EP07254056, Mar. 12, 2009, 10 pages.
AIAA 2007-647, Stereo PIV of a Turbine Tip Clearance Flow with Plasma Actuation, Daniel K. Van Ness II, Thomas C. Corke, and Scott C. Morris, 22 pages.
AIAA 2006-20, "Turbine Blade Tip Leakage Flow Control by Partial Squealer Tip and Plasma Actuators", Travis Douville, Julia Stephens, Thomas Corke, and Scott Morris, 18 pages.
AIAA 2005-782, "Tip Clearance Control Using Plasma Actuators", Scott C. Morris, Thomas C. corke, Daniel Van Ness, Julia Stephens, and Travis Douville, 8 pages.

(Continued)

*Primary Examiner*—Christopher Verdier
(74) *Attorney, Agent, or Firm*—William Scott Andes; Steven J. Rosen

(57) ABSTRACT

A gas turbine engine plasma blade tip clearance control system includes an annular shroud surrounding rotatable blade tips and an annular plasma generator spaced radially outwardly and apart from the blade tips. An exemplary embodiment of the annular plasma generator is mounted to the annular shroud and includes radially inner and outer electrodes separated by a dielectric material disposed within an annular groove in a radially inwardly facing surface of the annular shroud. The plasma generator is operable for producing an annular plasma between the annular shroud and blade tips and an effective clearance produced by the annular plasma between the annular shroud and blade tips that is smaller than a clearance between the annular shroud and blade tips.

26 Claims, 4 Drawing Sheets

OTHER PUBLICATIONS

XP007907306, "Active Flow Control in Turbomachinery Using Phased Plasma Actuators", B. Goksel and I. Rechenberg, 2 pages.

XP009112404, "Turbine Tip Clearance Flow Control using Plasma Actuators", Daniel K. Van Ness II, Thomas Co. Corke, and Scott C. Morris, 12 pages.

Science Direct, "SDBD plasma enhanced aerodynamics: concepts optimization and applications", Thomas C. Corke, Martiqua L. Post, and Dmitry M. Orlov, 26 pages.

XP007907356, "Plasma (physics)", From Wikipedia, 16 pages.

XP007907353, "Dielectric barrier discharge", From Wikipedia, 2 pages.

"Overview of Plasma Flow Control: Concepts, Optimization, and Applications", Thomas C. Corke and Martiqua L. Post, 43rd AIAA Aerospace Sciences Meeting and Exhibit, Jan. 10-13, 2005, Reno, Nevada, AIAA 2005-563, 15 pages.

"Plasma Control of Boundary Layer Using Low-Temperature Non-Equilibrium Plasma of Gas Discharge", D.F. Opaits, D.V. Roupassov, S.M. Starikovskaia, A.Yu. Starikovskii, I.N. Zavialov, and S.G. Saddoughi, 43rd AIAA Aerospace Sciences Meeting and Exhibit, Jan. 10-13, 2005, Reno, Nevada, AIAA 2005-1180, 6 pages.

"Demonstration of Separation Delay With Glow-Discharge Plasma Actuators", Lennart S. Hultgren and David E. Ashpis, 41st AIAA Aerospace Sciences Meeting and Exhibit, Jan. 6-9, 2003, Reno, Nevada, AIAA 2003-1025, 10 pages.

"Unsteady Plasma Actuators for Separation Control of Low-Pressure Turbine Blades", Junhui Huang, Thomas C. Corke and Flint O. Thomas, AIAA Journal, vol. 44, No. 7, Jul. 2006, pp. 1477-1487.

"Control of Separation in Turbine Boundary Layers", R.B. Rivir, R. Sondergaard, J.P. Bons, and N. Yurchenko, 2nd AIAA Flow Control Conference, Jun. 28-Jul. 1, 2004, Portland, Oregon, 16 pages.

"Plasma Flow Control Optimized Airfoil", Thomas C. Corke, Benjamin Mertz, and Mehul P. Patel, 44th AIAA Aerospace Sciences Meeting and Exhibit, Jan. 9-12, 2006, Reno, Nevada, AIAA 2006-1208, 13 pages.

"Control of Transitional and Turbulent Flows Using Plasma-Based Actuators", Miguel R. Visbal, Datta V. Gaitonde, and Subrata Roy, 36th AIAA Fluid Dynamics Conference and Exhibit, Jun. 5-8, 2006, San Francisco, California, AIAA 2006-3230, 22 pages.

"AC and Pulsed Plasma Flow Control", R. Rivir, A. White, C. Carter, B. Ganguly, J. Jacob, A. Forelines, and J. Crafton, 42nd AIAA Aerospace Sciences Meeting and Exhibit, Jan. 5-8, 2004, Reno, Nevada, AIAA 2004-847, 9 pages.

"Effects of Plasma Induced Velocity on Boundary Layer Flow", Brian E. Balcer, Milton E. Franke, and Richard B. Rivir, 44th AIAA Aerospace Sciences Meeting and Exhibit, Jan. 9-12, 2006, Reno, Nevada, AIAA 2006-875, 12 pages.

"Flow Control Using Plasma Actuators and Linear / Annular Plasma Synthetic Jet Actuators", Arvind Santhanakrishan, Jamey D. Jacob, and Yildirim B. Suzen, 3rd AIAA Flow Control Conference, Jun. 5-8, 2006, San Francisco, California, AIAA 2006-3033, 31 pages.

"Turbulent Drag Reduction by Surface Plasma through Spanwise Flow Oscillation", Timothy N. Jukes, Kwing-So Choi, Graham A. Johnson, and Simon J. Scott, 3rd AIAA Flow Control Conference, Jun. 5-8, 2006, San Francisco, California, AIAA 2006-3693, 14 pages.

\* cited by examiner

PLASMA BLADE TIP CLEARANCE CONTROL

BACKGROUND OF THE INVENTION

Field of the Invention

This invention relates to apparatus and methods for maintaining turbine blade tip clearances and, more particularly, to apparatus and methods for maintaining turbine blade tip clearances with passive and active clearance control.

Engine performance parameters such as thrust, specific fuel consumption (SFC), and exhaust gas temperature (EGT) margin are strongly dependent upon clearances between turbine and compressor blade tips and static seals or shrouds surrounding the blade tips. Over the duration of the engine's life, these clearances tend to increase as a result of blade rubs, oxidation, and erosion. The increase in blade tip clearance is due to the erosion of both the blade tip and the surrounding shroud, thus, causing a deterioration in engine performance and particularly in an increase in specific fuel consumption (SFC). It is highly desirable to prevent or limit this deterioration.

It is well known that a major factor in deterioration of engine efficiency and increasing specific fuel consumption of an aircraft gas turbine engines is the gradual increase in the clearance between the turbine blade tips and surrounding static seals or shrouds. Deterioration of the tip clearances increases the amount of flow losses and leakage of working fluid between blade tips and a surrounding shroud of the turbine across individual rotor stages in the turbine as well as compressor stages of the gas turbine engine. Such leakage reduces overall engine efficiency hence raising the total specific fuel consumption.

One method of managing the blade tip clearances to counter the deterioration of the blade tips and surrounding shrouds is "active clearance control". Active clearance control modulates a flow of cool air from the engine fan and/or compressor which is sprayed on a high or low pressure turbine casing to shrink the casing relative to the high pressure turbine blade tips under certain operating conditions, i.e. steady state, high altitude cruise conditions. The cooling air may be flowed to or sprayed on other static structure used to support the shrouds or seals around the blade tips. The modulated flow of cooling air may be used at preselected engine operating conditions and is designed to allow the engine to operate with minimum seal clearance for the majority of its operating cycle while reducing or eliminating the interference or abrasion between the seal and blade tips which can occur during transient conditions such as takeoff, throttle back, etc. There are also passive clearance control systems that maintain blade tip clearances by avoiding or reducing rubbing between the blade tips and the shroud.

It is highly desirable to eliminate, reduce, or minimize rubbing between the blade tips and the shroud and maintain blade tip running clearances between the blade tips and the shroud for as long as possible. It is highly desirable to maximize engine fuel efficiency and minimize specific fuel consumption (SFC) by minimizing flow losses and leakage of working fluid between the blade tip and the surrounding shroud. It is desirable to have a clearance system that can reduce the leakage flow area and blade tip running clearance without mechanically or thermally closing the blade tip running clearance.

SUMMARY OF THE INVENTION

A gas turbine engine plasma blade tip clearance control system includes an annular shroud surrounding rotatable blade tips and an annular plasma generator spaced radially outwardly and apart from the blade tips. The plasma generator operable for forming an annular plasma between the annular shroud and blade tips and an effective clearance produced by the annular plasma between the annular shroud and blade tips that is smaller than a cold clearance between the annular shroud and blade tips.

An exemplary embodiment of the system further includes the annular plasma generator being mounted to the annular shroud. Radially inner and outer electrodes separated by a dielectric material are connected to an AC power supply to supply a high voltage AC potential to the electrodes. The dielectric material is disposed within an annular groove in a radially inwardly facing surface of the annular shroud. An electronic controller is controllingly connected to the electrodes to control the annular plasma generator.

Another exemplary embodiment of the system includes the annular shroud being segmented and having shroud segments, annular groove segments in radially inwardly facing surfaces of the annular shroud segments, and the annular plasma generator including radially inner and outer electrodes separated by dielectric material in the annular groove segments.

A gas turbine engine plasma blade tip clearance control system may also be used in an aircraft gas turbine engine blade tip clearance system in conjunction with an active clearance control system. The active clearance control system uses thermal control air to maintain a tip running clearance between the rotatable blade tips and the annular shroud. The annular plasma generator is spaced radially outwardly and apart from the blade tips.

An aircraft gas turbine engine may be operated using a method for operating the plasma blade tip clearance control system for maintaining a clearance between rotatable blade tips and an annular shroud surrounding the rotatable blade tips. The method includes supplying an AC potential to radially inner and outer electrodes separated by a dielectric material of an annular plasma generator wherein the annular plasma generator is spaced radially outwardly and apart from the blade tips. One exemplary embodiment of the method further includes forming an annular plasma between the annular shroud and blade tips and an effective clearance produced by the annular plasma between the annular shroud and blade tips that is smaller than a cold clearance between the annular shroud and blade tips. An electronic controller may be used to control the annular plasma generator. An active clearance control system may also be used in conjunction with the plasma blade tip clearance control system to flow thermal control air to further maintain tip running clearance between the rotatable blade tips and the annular shroud.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
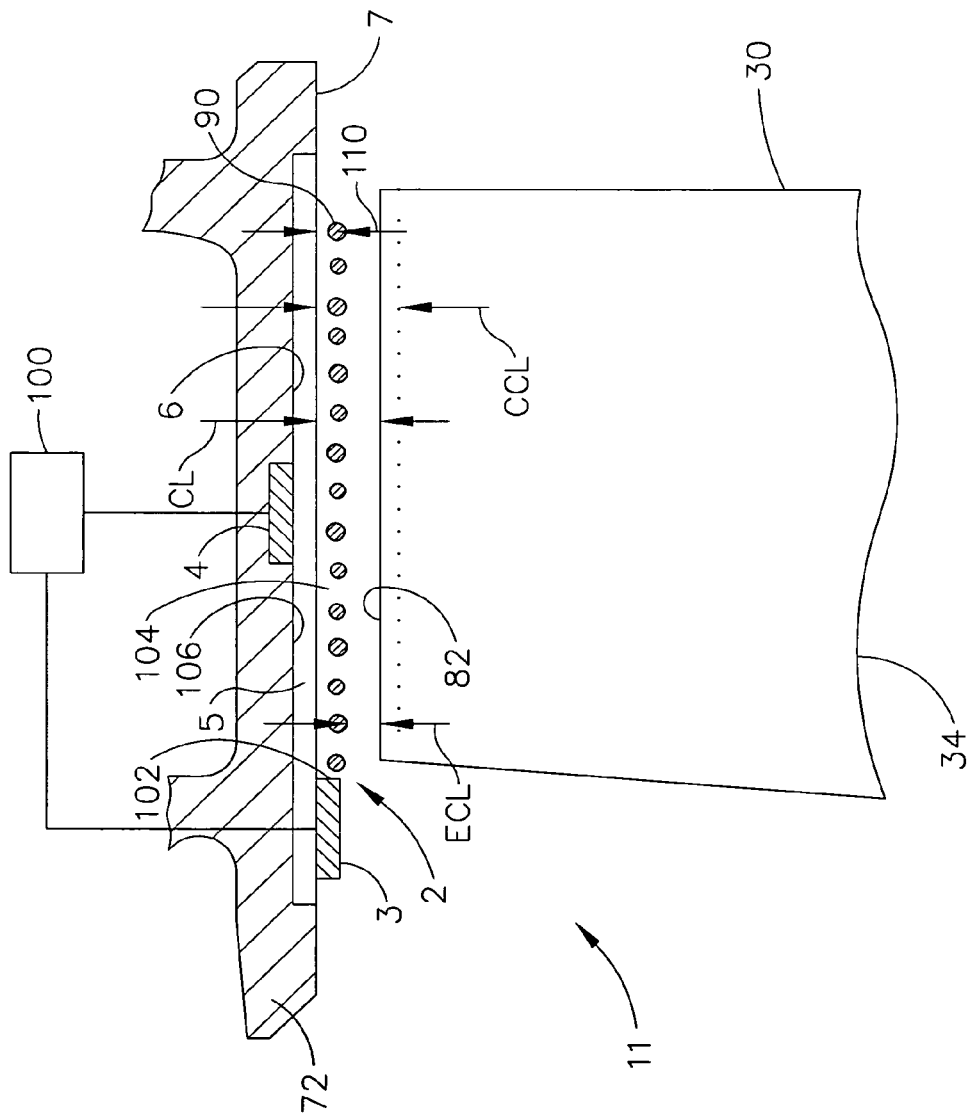
FIG. 1 is a schematical cross-sectional view illustration of a gas turbine engine plasma blade tip clearance control system.
Figure 3:
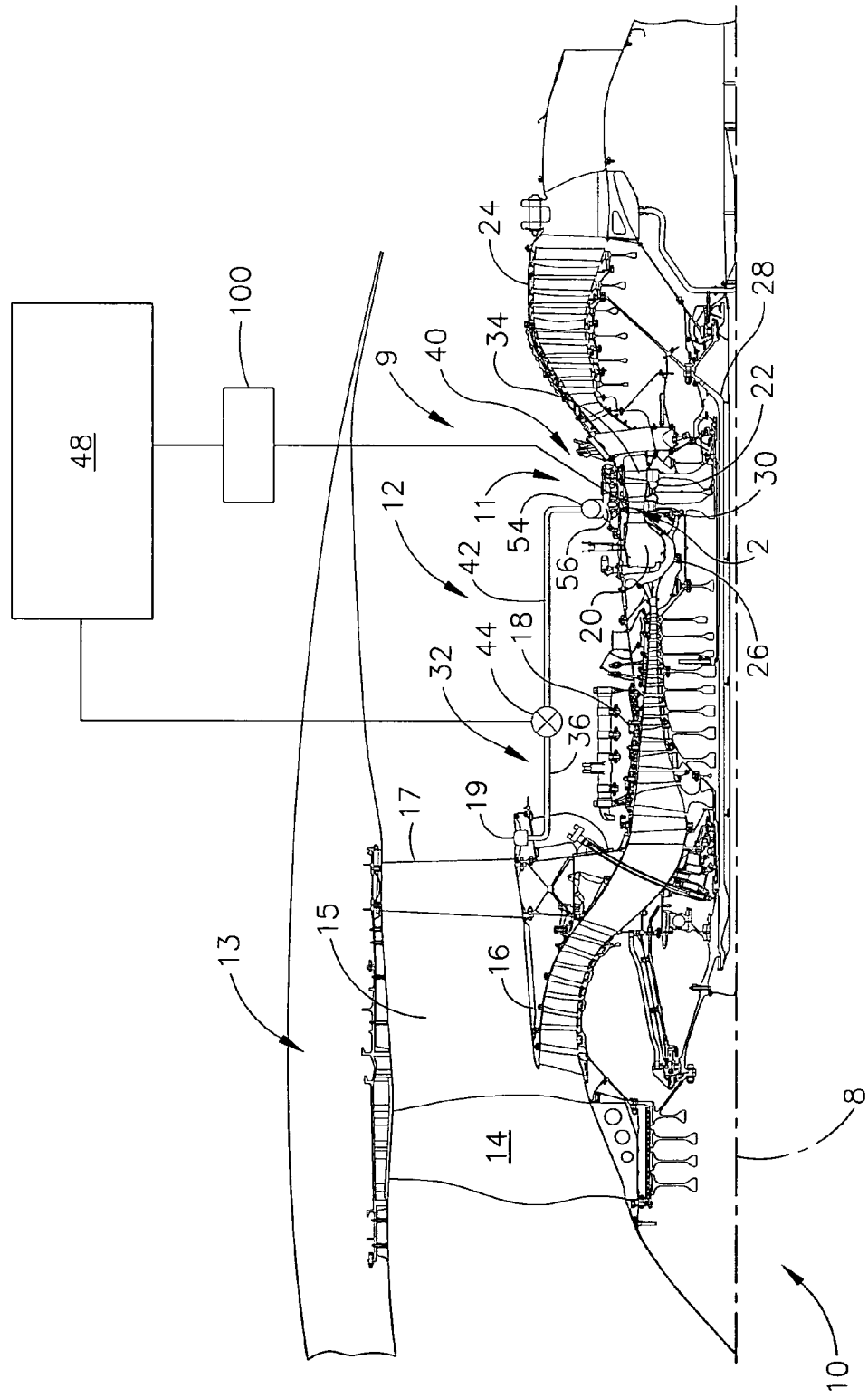
FIG. 3 is a schematical cross-sectional view illustration of an aircraft gas turbine engine with an active clearance control system and a plasma blade tip clearance control system.

Schematically illustrated in cross-section in FIG. 1 is an exemplary embodiment of a plasma blade tip clearance control system 11 for a gas turbine engine 10 such as the aircraft gas turbine engine illustrated in cross-section in FIG. 3. The gas turbine engine plasma blade tip clearance control system 11 includes an annular shroud 72 surrounding rotatable blade tips 82. An annular plasma generator 2 is spaced radially outwardly and apart from the blade tips 82.

Figure 2:
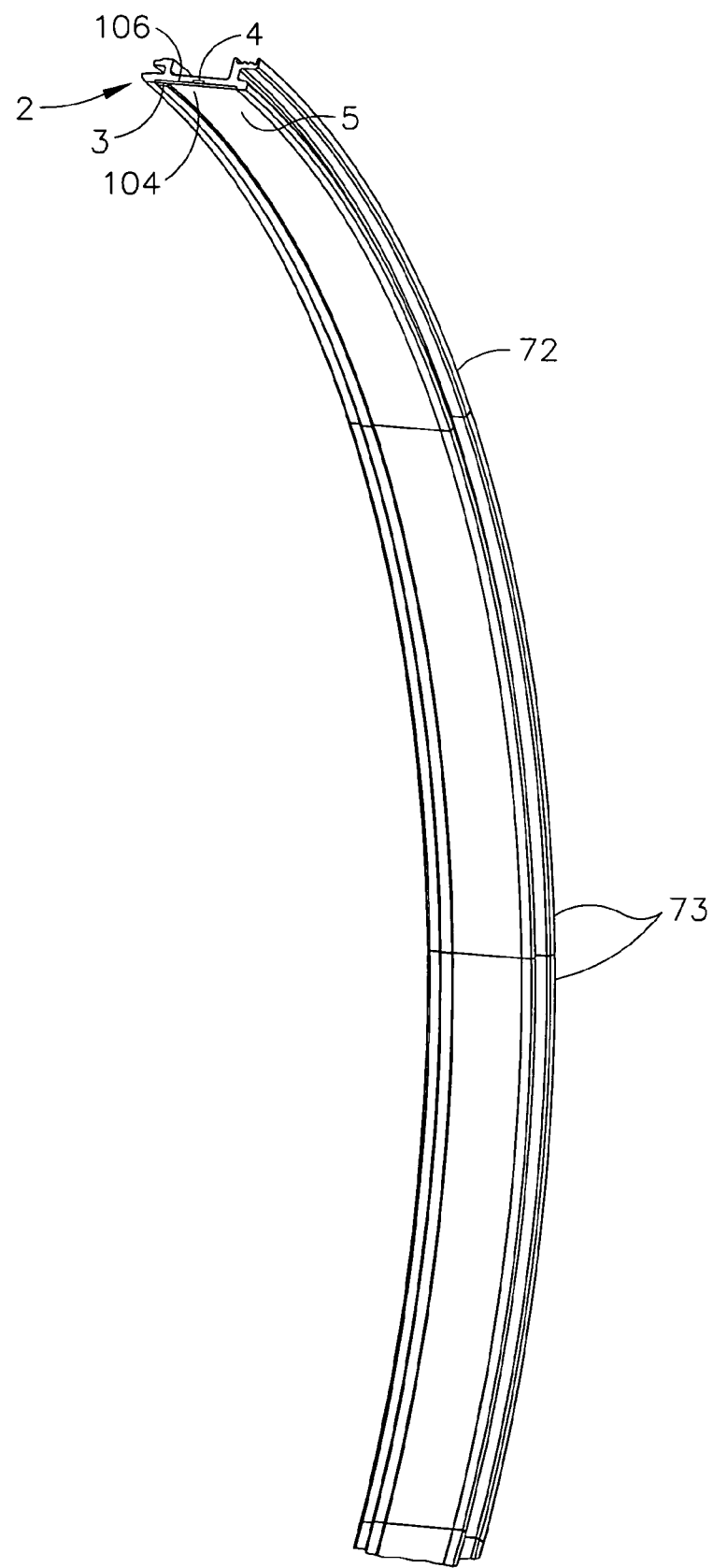
FIG. 2 is a schematical cross-sectional view illustration of a gas turbine engine plasma blade tip clearance control system with a segmented shroud.

An exemplary embodiment of the annular plasma generator 2, illustrated in FIG. 1, is mounted to the annular shroud 72 and includes radially inner and outer electrodes 3, 4 separated by a dielectric material 5. The dielectric material 5 is disposed within an annular groove 6 in a radially inwardly facing surface 7 of the annular shroud 72. The annular shroud 72 may be segmented into shroud segments 73 as illustrated in FIG. 2. Each of the shroud segments 73 includes an annular groove segment 106 with the dielectric material 5 disposed within the annular groove segment 106. This annular array of groove segments 106 with the dielectric material 5 disposed within the annular groove segments 106 forms the annular plasma generator 2.

An AC power supply 100 is connected to the electrodes to supply a high voltage AC potential to the electrodes. When the AC amplitude is large enough, the air ionizes in a region of largest electric potential forming a plasma 90. The plasma 90 generally begins at an edge 102 of the radially inner electrode 3 which is exposed to the air and spreads out over an area 104 projected by the outer electrode 4 which is covered by the dielectric material 5. The plasma 90 (ionized air) in the presence of an electric field gradient produces a force on the ambient air located radially inwardly of the plasma 90 inducing a virtual aerodynamic shape that causes a change in the pressure distribution over the radially inwardly facing surface 7 of the annular shroud 72. The air near the electrodes is weakly ionized, and there is little or no heating of the air.

During engine operation, the plasma blade tip clearance control system 11 turns on the plasma generator 2 to form the annular plasma 90 between the annular shroud 72 and blade tips 82. An electronic controller 48 may be used to control the plasma generator 2 and the turning on and off of the plasma generator 2. The electronic controller 48 may also be used to control the operation of the operation of the AC power supply 100 that is connected to the electrodes to supply a high voltage AC potential to the electrodes. The plasma 90 pushes a boundary layer 110 away from the radially inwardly facing surface 7 of the annular shroud 72. This produces an effective clearance ECL between the annular shroud 72 and blade tips 82 that is smaller than a cold clearance CCL between the annular shroud 72 and blade tips 82. The cold clearance CCL is the clearance when the engine is not running. The actual or running clearance CL between the annular shroud 72 and the blade tips 82 varies during engine operation due to thermal growth and centrifugal loads.

The cold clearance CCL between the annular shroud 72 and blade tips 82 is designed so that the blade tips do not rub against the annular shroud 72 during high powered operation of the engine, such as, during take-off when the blade disc and blades expand as a result of high temperature and centrifugal loads. The exemplary embodiment of the plasma blade tip clearance control system 11 illustrated herein is designed and operable to activate the plasma generator 2 to form the annular plasma 90 during a cruise condition of the aircraft being powered by the engine. Other embodiments of the plasma blade tip clearance control system 11 may be used in other types of gas turbine engines such as marine or perhaps industrial gas turbine engines.

Schematically illustrated in cross-section in FIG. 3 is an exemplary embodiment of an aircraft gas turbine engine 10 including a blade tip clearance system 9. The blade tip clearance system 9 includes an active clearance control system 12 illustrated as using thermal control air 36 (cooling air in the exemplary embodiment illustrated herein) to maintain tip clearances and a plasma blade tip clearance control system 11. The plasma blade tip clearance control system 11 in other embodiments may be used with passive clearance control without the active clearance control system 12. The engine 10 has, in serial flow relationship, a fan section 13 including a fan 14, a booster or low pressure compressor (LPC) 16, a high pressure compressor (HPC) 18, a combustion section 20, a high pressure turbine (HPT) 22, and a low pressure turbine (LPT) 24. A high pressure shaft 26, disposed about an engine centerline 8, drivingly connects the HPT 22 to the HPC 18 and a low pressure shaft 28 drivingly connects the LPT 24 to the LPC 16 and the fan 14. The HPT 22 includes an HPT rotor 30 having turbine blades 34 mounted at a periphery of the rotor 30.

Figure 4:
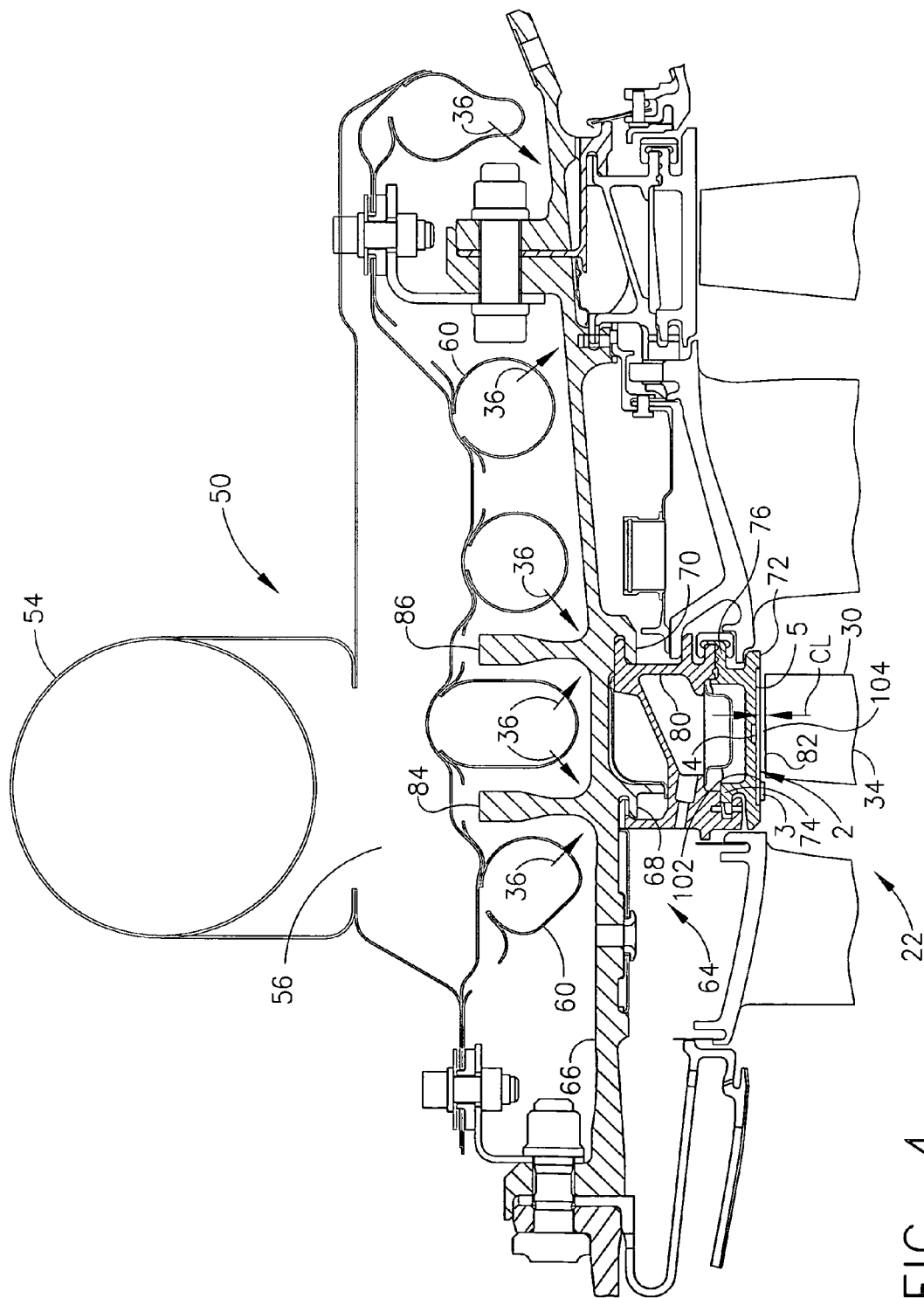
FIG. 4 is an enlarged cross-sectional view illustration of a shroud with a plasma generator, schematically illustrated, of the plasma blade tip clearance control system illustrated in FIG. 3.

Illustrated in FIG. 4 is a stator assembly 64 attached to a radially outer casing 66 of the HPT 22 by forward and aft case hooks 68 and 70. The stator assembly 64 includes an annular segmented stator shroud 72 mounted by forward and aft shroud hooks 74 and 76 to an annular segmented shroud support 80. The shroud 72 circumscribes turbine blades 34 of the rotor 30 and helps reduce the flow from leaking around radially outer blade tips 82 of the blades 34. The active clearance control system 12 is used to minimize the radial blade tip running clearance CL between the blade tips 82 and the shroud 72, particularly during cruise operation of the engine 10.

It is well known in the industry that a small turbine blade tip running clearance CL provides lower operational specific fuel consumption (SFC) and, thus, large fuel savings particularly at cruise or steady state operating conditions. In order to more effectively control blade tip running clearance CL with a minimal amount of time lag and thermal control (cooling or heating depending on operating conditions) air flow, forward and aft thermal control rings 84 and 86 are provided. Forward and aft thermal control rings 84 and 86 are associated with the outer casing 66 and may be integral with the respective casing (as illustrated in FIG. 4), bolted to or otherwise fastened to the casing, or mechanically isolated from but in sealing engagement with the casing. The thermal control rings provide thermal control mass to more effectively move the stator shroud 72 radially inwardly (and outwardly if so designed) to adjust the blade tip running clearances CL. The spray tubes 60 impinge the thermal control air 36 (cooling air) on the forward and aft thermal control rings 84 and 86 and if so desired on the outer casing 66 to cause the stator shroud 72 to move radially inwardly to tighten up or minimize the blade tip running clearance CL.

Referring to FIGS. 3 and 4, a compressed fan air supply 32 may be used as a source for thermal control air 36 which is supplied to a turbine blade tip active clearance control apparatus generally shown at 40 through an axial air supply tube 42. An air supply inlet 19 to the axial air supply tube 42 is located downstream of exit guide vanes 17 disposed in the fan bypass duct 15 downstream of the fan 14. An air valve 44 disposed in the air supply tube 42 controls the total amount of thermal control air 36 flowed therethrough. The thermal control air 36 is cooling air in the exemplary embodiment of the active clearance control system 12 illustrated herein. The cooling air is controllably flowed from a fan bypass duct 15 surrounding the booster or low pressure compressor (LPC) 16 through the axial air supply tube 42 to a distribution manifold 50 of the turbine blade clearance control apparatus 40.

The air valve 44 and the amount of thermal control air 36 impinged for controlling the turbine blade tip running clearance CL (illustrated in FIGS. 1 and 4) is controlled by the electronic controller 48. The controller 48, illustrated herein, is a digital electronic engine control system often referred to as a Full Authority Digital Electronic Control (FADEC) and controls the amount and temperature if so desired of the thermal control air 36 impinged on forward and aft thermal control rings 84 and 86 and, thus, to control the turbine blade tip running clearance CL. The manifold 50 includes an annular header tube 54 which distributes the cooling air to a plurality of plenums 56 which in turn distributes the cooling air to a plurality of spray tubes 60 as illustrated in FIG. 4.

The shroud 72 circumscribes turbine blades 34 of the rotor 30 and helps reduce the flow from leaking around radially outer blade tips 82 of the blades 34. The plasma blade tip clearance control system 11 may be used in conjunction with the ACC system of the aircraft gas turbine engine 10 and includes the segmented annular shroud 72 surrounding the rotatable blade tips 82. An annular plasma generator 2 is spaced radially outwardly and apart from the blade tips 82. The annular shroud 72 is segmented and thus the annular plasma generator 2 is segmented having a segmented annular groove 6 and segmented dielectric material 5 disposed within the segmented annular groove 6. Each segment of shroud has a segment of the annular groove, a segment of the dielectric material disposed within the segment of the annular groove, and radially inner and outer electrodes separated by the segment of the dielectric material disposed within the segment of the annular groove.

An AC (alternating current) supply 100 is used to supply a high voltage AC potential, in a range of about 3-20 kV (kilovolts), to the electrodes (AC standing for alternating current). When the AC amplitude is large enough, the air ionizes in a region of largest electric potential forming a plasma 90. The plasma 90 generally begins at edges of the radially inner electrodes and spreads out over an area projected by the outer electrodes which are covered by the dielectric material. The plasma 90 (ionized air) in the presence of an electric field gradient produces a force on the ambient air located radially inwardly of the plasma 90 inducing the virtual aerodynamic shape that causes a change in the pressure distribution over the radially inwardly facing surface 7 of the annular shroud 72. The air near the electrodes is weakly ionized, and there is little or no heating of the air.

The plasma blade tip clearance control system 11 can also be used in a compressor section of the engine such as the low pressure compressor (LPC) 16 and/or the high pressure compressor (HPC) 18 which also have annular shrouds 72 and rotor blade tips 82.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A gas turbine engine plasma blade tip clearance control system comprising:
    an annular shroud surrounding rotatable blade tips,
    an annular plasma generator, and
    the entire plasma generator spaced radially outwardly and apart from the blade tips.

2. A system as claimed in claim 1 further comprising the annular plasma generator mounted to the annular shroud.

3. A system as claimed in claim 2 further comprising the annular plasma generator including radially inner and outer electrodes separated by a dielectric material.

4. A system as claimed in claim 3 further comprising an AC power supply connected to the electrodes to supply a high voltage AC potential to the electrodes.

5. A system as claimed in claim 4 further comprising the dielectric material disposed within an annular groove in a radially inwardly facing surface of the annular shroud.

6. A system as claimed in claim 1 further comprising the plasma generator operable for forming an annular plasma between the annular shroud and blade tips and an effective clearance produced by the annular plasma between the annular shroud and blade tips that is smaller than a cold clearance between the annular shroud and blade tips.

7. A system as claimed in claim 1 further comprising an electronic controller operable to control the annular plasma generator.

8. A system as claimed in claim 7 further comprising the annular plasma generator mounted to the annular shroud.

9. A system as claimed in claim 8 further comprising the annular plasma generator including radially inner and outer electrodes separated by a dielectric material.

10. A system as claimed in claim 9 further comprising the dielectric material disposed within an annular groove in a radially inwardly facing surface of the annular shroud.

11. A system as claimed in claim 1 further comprising:
    the annular shroud being segmented and having shroud segments,
    annular groove segments in radially inwardly facing surfaces of the annular shroud segments, and
    the annular plasma generator including radially inner and outer electrodes separated by dielectric material in the annular groove segments.

12. A system as claimed in claim 11 further comprising an AC power supply connected to the electrodes to supply a high voltage AC potential to the electrodes.

13. A system as claimed in claim 12 further comprising an electronic controller operable to control the annular plasma generator.

14. An aircraft gas turbine engine blade tip clearance system comprising:
    an annular shroud surrounding rotatable blade tips,
    an active clearance control system for using thermal control air to maintain a tip running clearance between the rotatable blade tips and the annular shroud, and
    an annular plasma generator, and
    the entire plasma generator spaced radially outwardly and apart from the blade tips.

15. A system as claimed in claim 14 further comprising the annular plasma generator mounted to the annular shroud.

16. A system as claimed in claim 15 further comprising the annular plasma generator including radially inner and outer electrodes separated by a dielectric material.

17. A system as claimed in claim 16 further comprising the dielectric material disposed within an annular groove in a radially inwardly facing surface of the annular shroud.

18. A system as claimed in claim 17 further comprising an AC power supply connected to the electrodes to supply a high voltage AC potential to the electrodes.

19. A system as claimed in claim 14 further comprising:
the annular shroud being segmented and having shroud segments,
annular groove segments in radially inwardly facing surfaces of the annular shroud segments, and
the annular plasma generator including radially inner and outer electrodes separated by dielectric material in the annular groove segments.

20. A system as claimed in claim 19 further comprising an electronic controller operable to control the annular plasma generator.

21. A system as claimed in claim 14 further comprising the plasma generator operable for forming an annular plasma between the annular shroud and blade tips and an effective clearance produced by the annular plasma between the annular shroud and blade tips that is smaller than a cold clearance between the annular shroud and blade tips.

22. A method for operating an aircraft gas turbine engine plasma blade tip clearance control system for maintaining a clearance between rotatable blade tips and an annular shroud surrounding the rotatable blade tips, the method comprising supplying an AC potential to radially inner and outer electrodes separated by a dielectric material of an annular plasma generator wherein the entire annular plasma generator is spaced radially outwardly and apart from the blade tips.

23. A method as claimed in claim 22 further comprising the dielectric material being disposed within an annular groove in a radially inwardly facing surface of the annular shroud.

24. A method as claimed in claim 22 further comprising forming an annular plasma between the annular shroud and blade tips and an effective clearance produced by the annular plasma between the annular shroud and blade tips that is smaller than a cold clearance between the annular shroud and blade tips.

25. A method as claimed in claim 22 further comprising using an electronic controller to control the annular plasma generator.

26. A method as claimed in claim 22 further comprising using an active clearance control system to flow thermal control air to further maintain tip running clearance between the rotatable blade tips and the annular shroud.

* * * * *